United States Patent [19]

Matsuura et al.

[11] Patent Number: 5,136,224
[45] Date of Patent: Aug. 4, 1992

[54] DIGITIZING METHOD

[75] Inventors: Hitoshi Matsuura; Hitoshi Aramaki, both of Tokyo, Japan

[73] Assignee: Fanuc Ltd., Minamitsuru, Japan

[21] Appl. No.: 465,204

[22] PCT Filed: Jul. 5, 1989

[86] PCT No.: PCT/JP89/00675
§ 371 Date: Mar. 5, 1990
§ 102(e) Date: Mar. 5, 1990

[87] PCT Pub. No.: WO90/00767
PCT Pub. Date: Jan. 25, 1990

[30] Foreign Application Priority Data

Jul. 8, 1988 [JP] Japan .................. 63-170256

[51] Int. Cl.$^5$ ................ G06F 15/46; G05B 19/36
[52] U.S. Cl. .................... 318/578; 318/571;
318/579; 364/474.11; 364/474.15; 364/474.28
[58] Field of Search ................ 318/560-640;
364/474.15, 474.03, 474.11, 474.27, 474.28,
474.29, 474.30, 474.31, 474.32

[56] References Cited

U.S. PATENT DOCUMENTS

| | | | |
|---|---|---|---|
| 4,224,670 | 9/1980 | Yamazaki | 318/578 |
| 4,296,473 | 10/1981 | Imazeki et al. | 318/578 X |
| 4,355,362 | 10/1982 | Imazeki et al. | 318/571 X |
| 4,357,664 | 11/1982 | Imazeki et al. | 318/571 X |
| 4,467,432 | 8/1984 | Imazeki et al. | 318/578 X |
| 4,575,665 | 3/1986 | Matsuura et al. | 318/578 |
| 4,620,142 | 10/1986 | Yamazaki et al. | 318/578 |
| 4,654,570 | 3/1987 | Yamazaki | 318/578 |
| 4,703,239 | 10/1987 | Yamazaki et al. | 318/578 |
| 4,719,578 | 1/1988 | Okitomo et al. | 318/578 X |
| 4,814,998 | 3/1989 | Aramaki | 318/603 X |

Primary Examiner—Paul Ip
Attorney, Agent, or Firm—Staas & Halsey

[57] ABSTRACT

A digitizing method for digitizing model surface data by tracing a model (MDL) with a stylus (STL) is described. At the time of digitizing, a time (T) required for predetermined conditions to be satisfied and stylus traveling distance ($\Delta L$) during this time are monitored, tracing velocity (F) is obtained based on this time and traveling distance, and the tracing velocity is output along with data indicative of the model surface profile.

8 Claims, 4 Drawing Sheets

DIGITIZING METHOD

BACKGROUND OF THE INVENTION

1. Field of the Invention

This invention relates to a digitizing method and, more particularly, to a digitizing method in which tracing velocity at the time of digitizing is output as velocity data along with model profile data.

2. Description of Related

A method of creating NC data for performing machining in accordance with the profile of a model is available and includes tracing the surface of the model with a stylus by means of tracer control, digitizing the model surface profile by accepting stylus position data at a predetermined period T, and creating the NC data using the digitized data.

FIGS. 5(a) and 5(b) are explanatory view in which profile data indicative of the surface of a model MDL is digitized by two-way surface tracing. A stylus STL is moved in the direction of the X axis at a predetermined tracing velocity and up and down along the model MDL in the direction of the Z axis, and stylus three-dimensional position data (coordinates) Xi, Yi, Zi and displacement data $\epsilon x$, $\epsilon y$, $\epsilon z$ are accepted and stored at predetermined times or whenever predetermined conditions are satisfied. When the boundary of a tracing region TRR is reached, a predetermined amount of pick-feed is performed along the Y axis. Thereafter, the position and displacement of the stylus STL are monitored while surface tracing is performed in the same manner, the resulting position data and displacement data is accepted, the surface profile of the model MDL is digitized, and NC data is subsequently created using the digitized data.

In general, when digitizing is carried out by such tracing, stylus center-position data and displacement data is read in but velocity information is not. When the NC data is created, feed rate is set by an F code using an MDI unit (manual data input unit) or the like.

However, if the set F code (feed rate) is greater than the machining capability of the machine tool, tool breakage can result. Conversely, if the F code is less than the machining capability of the machine tool, too much machining time is required.

Consequently, when performing machining by NC data created using digitized data, it is required conventionally that the operator manipulate an override switch or the like to vary the machining velocity, which is based on the F code, over a range of, say, 0–120%, or to revise the machining velocity to an appropriate value.

SUMMARY OF THE INVENTION

Accordingly, an object of the present invention is to provide a digitizing method in which tracing velocity at the time of digitizing is output as velocity information along with model profile data.

In order to output tracing velocity at the time of digitizing as velocity information, traveling distance $\Delta L$ within a predetermined time period T is obtained, tracing velocity F ($=\Delta L/T$) is calculated using this time period and traveling distance, and the tracing velocity F is output as velocity information along with model profile data.

DESCRIPTION OF THE PREFERRED EMBODIMENTS

Figure 1:
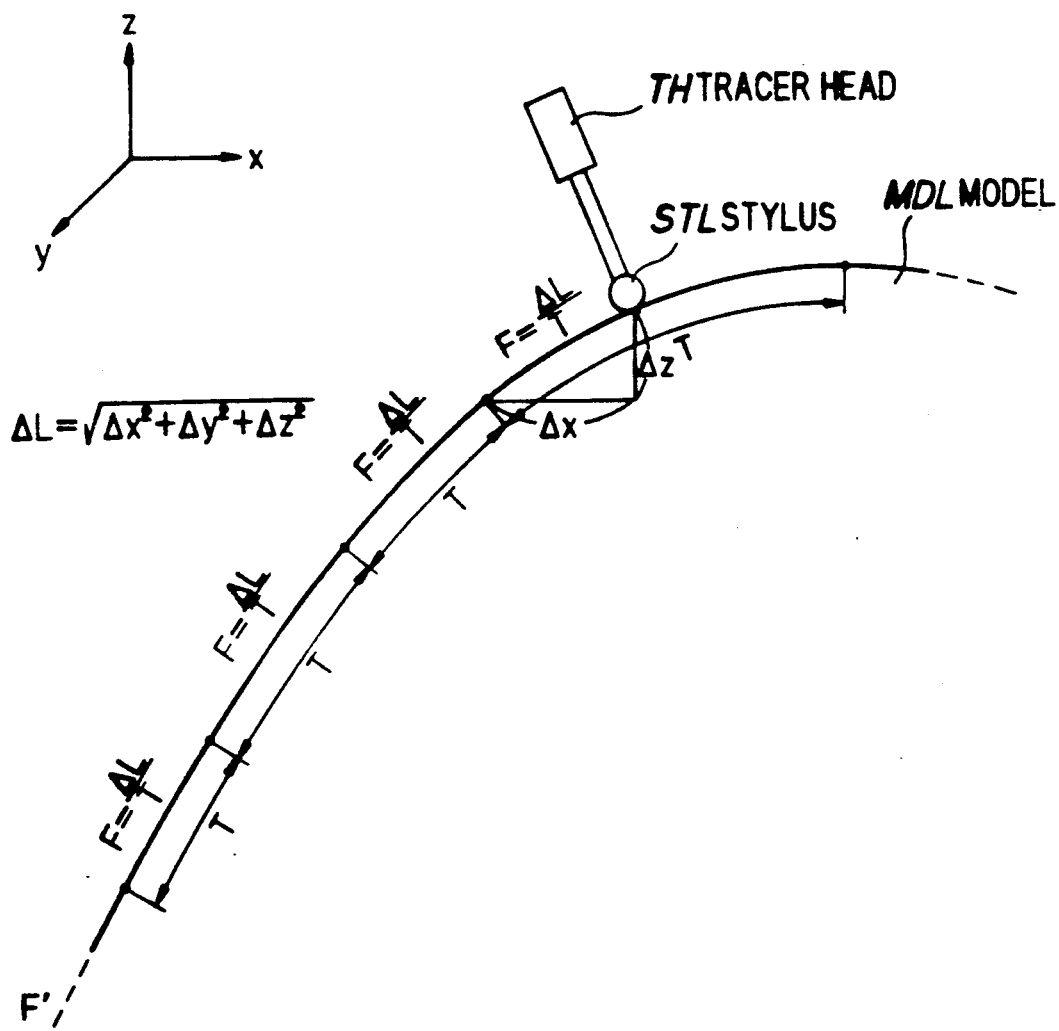
FIG. 1 is a schematic explanatory view of the method of the present invention.

FIG. 1 is a schematic explanatory view of the method of the present invention. STL represents a stylus, TH a tracer head, MDL a model, and T the time (e.g., period) required for predetermined conditions to be satisfied. Further $\Delta x$, $\Delta y$, $\Delta z$ denote increments along the respective axes, $\Delta L$ the resultant value (traveling distance) of the increments, F the tracing velocity, and F' the latest output velocity information.

When model surface data for coarse machining is digitized by pencil tracing, manual tracing or the like, the operator takes the machining capability of the machine tool into consideration and digitizes the surface data while tracing is carried out at an appropriate velocity. Therefore, when NC data is created using digitized data resulting from pencil tracing or manual tracing, it is convenient if the tracing velocity prevailing at the time of digitizing is output as machining velocity.

In the present invention, when digitizing is carried out, the increments $\Delta x$, $\Delta y$, $\Delta z$ along the respective axes within the predetermined time period T are calculated, the traveling distance $\Delta L$ is calculated in accordance with the equation $$\Delta L = \sqrt{\Delta x^2 + \Delta y^2 + \Delta z^2}$$

the tracing velocity F is calculated from $F = \Delta L/T$, and the tracing velocity F is output as velocity information along with the stylus position data and displacement data. Further, velocity information is not output when a difference $\Delta F$ between the calculated tracing velocity F and the latest output velocity information F' is less than a predetermined value. The velocity information F is output, and the velocity information F' is replaced by the velocity information F ($F \rightarrow F'$), only when $\Delta F$ is greater than the predetermined value.

Figure 2:
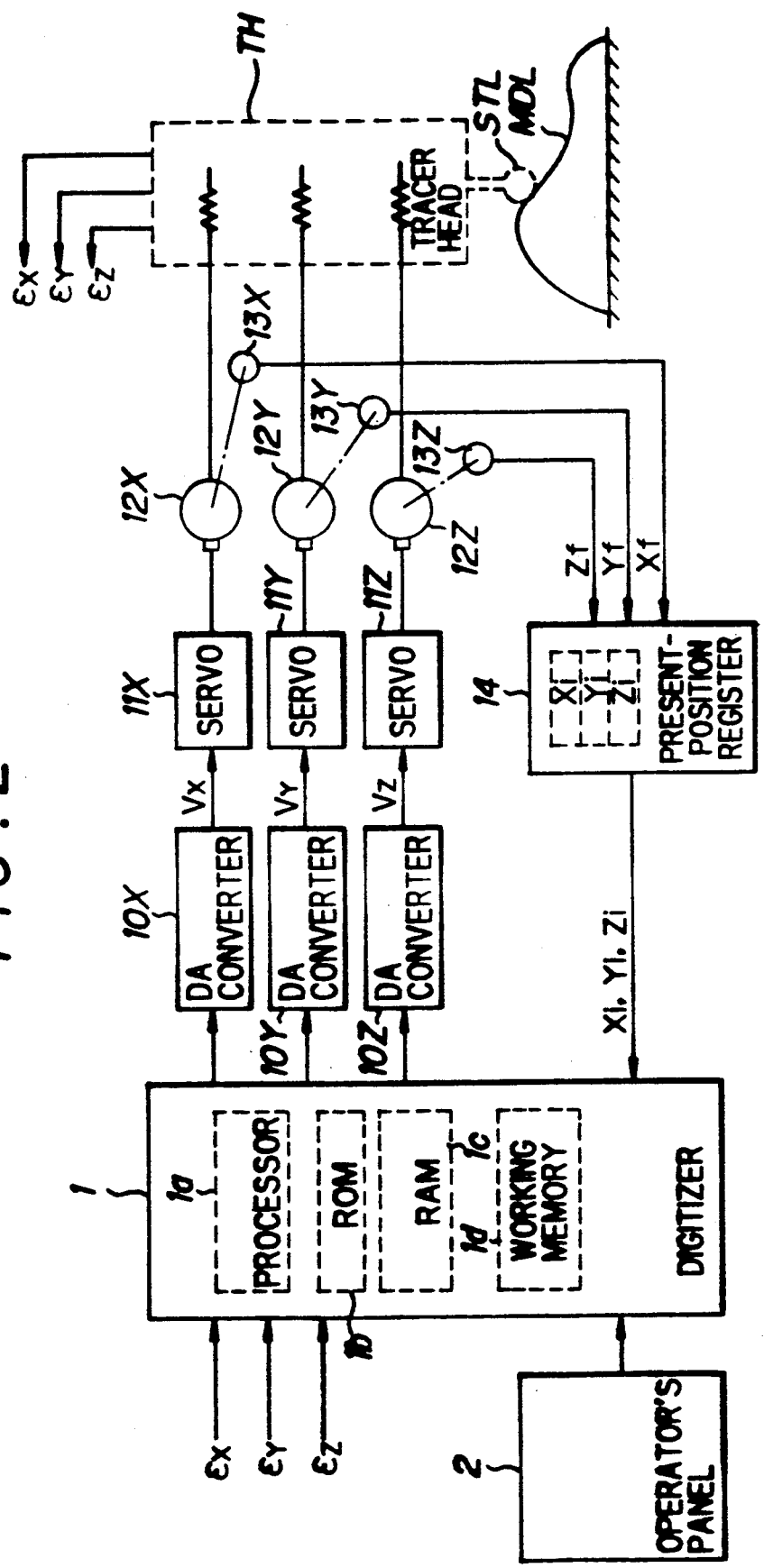
FIG. 2 is a block diagram of a system for practicing the method of the present invention.

FIG. 2 is a block diagram of a system for practicing the method of the present invention. Numeral 1 denotes a digitizer having a digitizing function for accepting the present position Xi, Yi, Zi of a stylus while tracer control is being performed. The digitizer 1 has a processor 1a, a ROM 1b storing a control program, a RAM 1c for storing digitized position data, and a working memory 1d. The digitizer 1 calculates the increments $\Delta x$, $\Delta y$, $\Delta z$ along the respective axes, and calculates the resultant value (traveling distance) $\Delta L$ of the increments in accordance with the equation $$\Delta L = \sqrt{\Delta x^2 + \Delta y^2 + \Delta z^2} \tag{1}$$

The traveling distance $\Delta L$ is calculated whenever predetermined conditions are satisfied, e.g., at a sampling period T. The digitizer then computes the tracing velocity F from the equation $$F = \Delta L / T \quad (2)$$

and stores the tracing velocity F as velocity information, along with the stylus present-position data Xi, Yi, Zi and displacement data $\epsilon x$, $\epsilon y$, $\epsilon z$, in the RAM 1c. In actuality, the tracing velocity (velocity information) F and latest stored velocity information F' are compared and the velocity information is not stored in the RAM 1c when the difference $\Delta F$ is less than a predetermined value. The velocity information F is stored in the RAM 1c, and the velocity information F' is replaced by the velocity information F (F→F'), only when $\Delta F$ is greater than the predetermined value.

Numeral 2 denotes an operator's panel having functions for inputting various operation signals and setting tracing conditions, tracing region TRR (see FIG. 5), tracing method and the like.

Numerals 10X, 10Y, 10Z denote DA converters for converting velocity data (digital values) along respective axes commanded by the digitizer 1 into respective analog velocity signals Vx, Vy, Vz. Numerals 11X, 11Y, 11Z denote X-, Y- and Z-axis servo circuits, respectively; 12X, 12Y, 12Z denote X-, Y- and Z-axis servomotors, respectively: 13X, 13Y, 13Z represent pulse generators for generating single pulses Xf, Yf, Zf, respectively, each time the corresponding motors rotate through a predetermined angle; and 14 denotes a present-position register for reversibly counting the pulses Xf, Yf, Zf, in accordance with the direction of travel, to store the present positions Xi, Yi, Zi along the respective axes. TH represents a tracer head, SR a stylus, and MDL a model.

Figure 3:
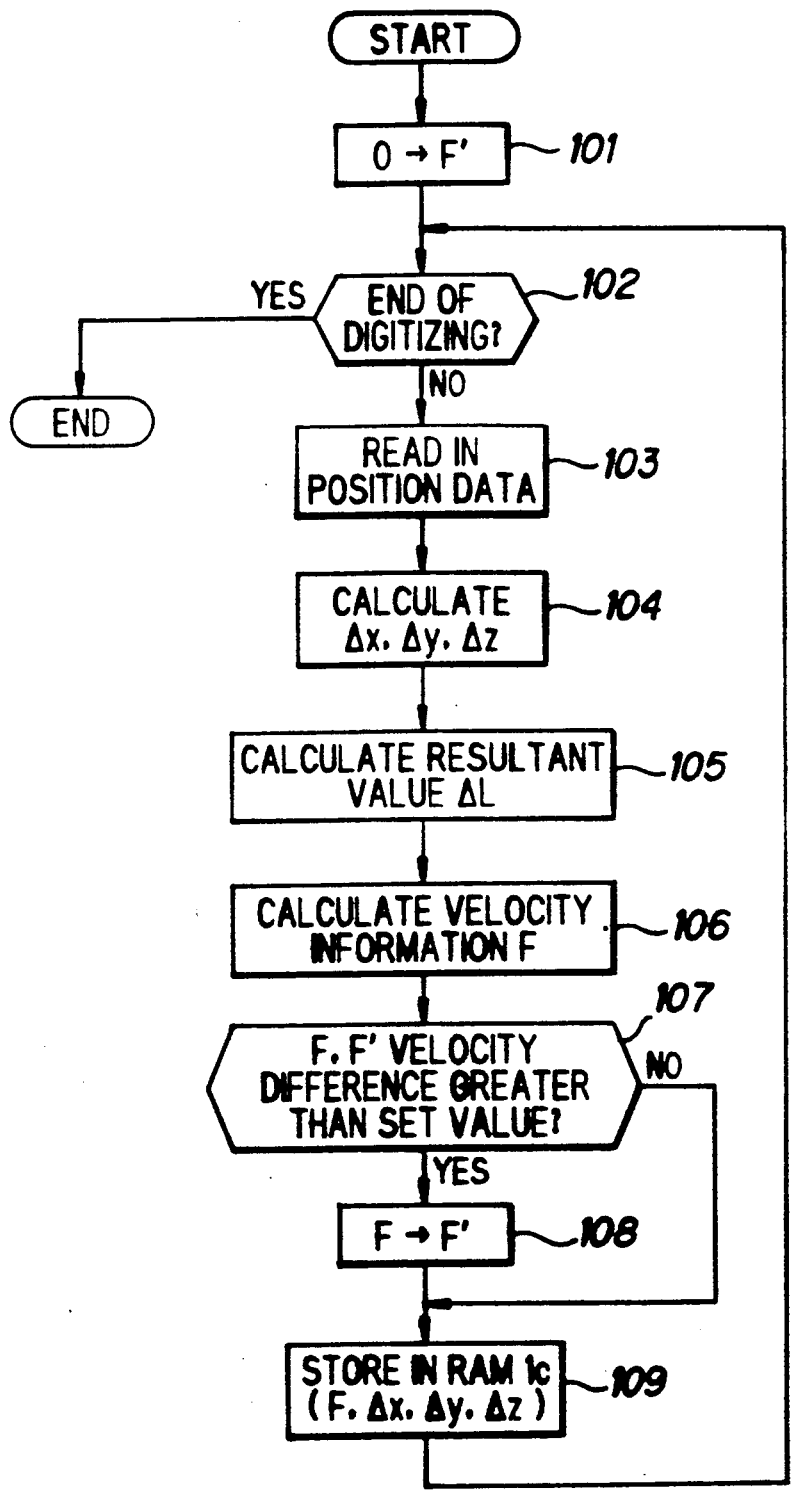
FIG. 3 is a flowchart of processing according to the method of the present invention.

The processing according to the method of the invention will now be described in accordance with the flowchart of FIG. 3. It is assumed here that two-way surface tracing is carried out manually with the X, Z and Y axes serving as the feed axis, tracing axis and pick-feed axis, respectively, that surface data is created upon reading in, at predetermined times, the coordinates of the stylus position (the black dots in FIG. 1), amount of stylus displacement and tracing velocity by means of digitizing processing performed in concurrence with the aforementioned tracing, and that the surface data is stored in the RAM 1c.

When the above-mentioned digitizing is carried out, first the velocity data is set or stored and digitizing is started by the operation 0→F' (step 101).

Figure 5A:
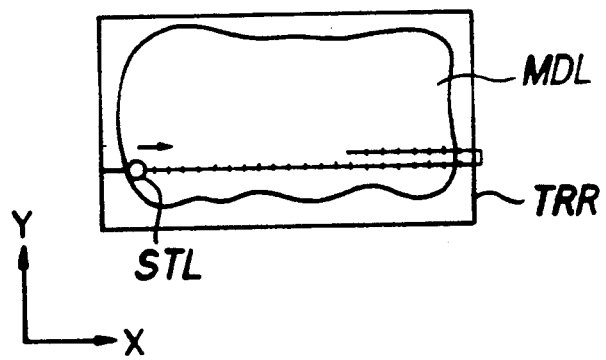
FIGS. 5(a) and 5(b) are explanatory views in which data indicative of the surface of a model MDL is digitized by two-way surface tracing.
Figure 5B:
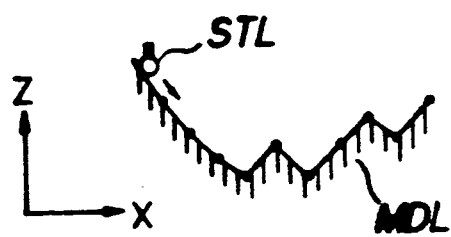

Thereafter, the digitizer 1 determines whether digitizing in a predetermined region, such as the tracing region TRR shown in FIG. 5, by way of example, has ended (step 102). If the answer is NO, the digitizer reads in the position data Xi, Yi, Zi in the present-position register 14 at the sampling period T (step 103) and calculates the increments $\Delta x$, $\Delta y$, $\Delta z$ along the respective axes based on the position data Xi, Yi, Zi and position data Xi-1, Yi-1, Zi1 read in one sampling instant earlier (step 104).

Next, the traveling distance $\Delta L$ is calculated in accordance with Eq. (1) (step 105), and the tracing velocity F is calculated from Eq. (2) (step 106).

Thereafter, the tracing velocity F and velocity information F' (the initial value of which is zero) one sampling instant earlier are compared (step 107). If the velocity difference between the two is greater than a predetermined value, the velocity data F' is updated by the operation F→F' (step 108) and the velocity data F' is stored in the RAM 1c along with the stylus center-position data (Xi, Yi, Zi) and displacement data ($\epsilon x$, $\epsilon y$, $\epsilon z$) prevailing at the sampling period T (step 109).

When the processing of step 109 is terminated, operation returns to step 102 and processing from this step onward is repeated. When it is determined at step 102 that digitizing in the predetermined region has ended, processing according to the present invention is terminated.

If the velocity difference $\Delta F$ is found to be less than the predetermined value at the decision of step 107, then processing jumps to step 109 without the velocity information F' being updated. In this case, only the stylus center-position data and displacement data is stored in the RAM 1c; velocity information is not stored.

Figure 4:
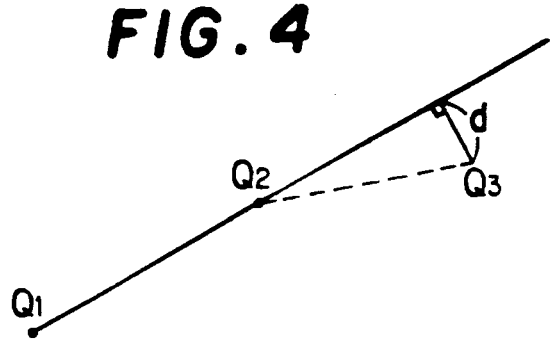
FIG. 4 is view for describing other conditions when processing according to the invention is performed.

According to the foregoing embodiment, a case is described in which digitizing data is created at the predetermined sampling time, T. However, as shown in FIG. 4, an embodiment is possible in which, when the two latest digitized points are designated by Q1, Q2 and the position sampled at the period T is designated by Q3, the distance d from the point Q3 to the straight line Q1Q2 is compared, in terms of magnitude, with a preset tolerance value a, and the point Q3 is not digitized if the distance d is less than the tolerance value a but is digitized if d is greater a. In this case, if the digitized point Q3 is a point sampled at a time n·T after the digitized point Q2, then the tracing velocity F is calculated in accordance with the equation $$F = \Delta L / n \cdot T \quad (3)$$

Thus, in accordance with the present invention, the arrangement is such that the increments $\Delta x$, $\Delta y$, $\Delta z$ along the respective axes during the time that the predetermined conditions are satisfied are calculated, the time T required for the conditions to be satisfied is monitored, tracing velocity at digitizing is calculated using these increments and time data, and the tracing velocity is output as velocity information (an F code). This is advantageous in that machining can be performed at a velocity identical with that at the time of digitizing.

Further, in accordance with the present invention, the arrangement is such that the calculated tracing velocity F and the latest output velocity information F' are compared, and the velocity information F is outputted only when the difference between these velocities has exceeded a predetermined value. As a result, the machining velocity will not undergo small fluctuations.

We claim:

1. A digitizing method for tracing a model surface with a stylus by tracer control and digitizing a profile of the model surface upon reading in stylus position data at a predetermined period T, and performing machining based on the profile of the model surface, said method comprising the steps of:

(a) calculating increments $\Delta x$, $\Delta y$, $\Delta z$ along respective axes obtained while tracing the model, at the period T and calculating a traveling distance using the increments;

(b) obtaining tracing velocity from the period T and the traveling distance;

(c) outputting said tracing velocity as velocity information F along with data indicative of the model surface profile for performing machining based on the profile of the model surface and said tracing velocity;

(d) comparing said velocity information F and a previous output velocity F';

(e) refraining from outputting said velocity information if a velocity difference between said velocity information and said previous velocity F' is less than a set value; and (f) outputting said velocity information F along with said data indicative of the model surface profile only if the velocity difference exceeds the set value.

2. A digitizing method for tracing a model surface with a stylus by tracer control and digitizing a profile of the model surface upon reading in stylus position data whenever predetermined conditions are satisfied, said method comprising the steps of:

(a) calculating increments $\Delta x$, $\Delta y$, $\Delta z$ along the respective axes when said predetermined conditions are satisfied and monitoring a time T required for the conditions to be satisfied;

(b) calculating a traveling distance using said increments and obtaining a tracing velocity from the time T and the traveling distance; and (c) outputting said tracing velocity as velocity information F along with data indicative of the model surface profile for performing machining based on the profile of the model surface and said tracing velocity, wherein said predetermined conditions are satisfied when a distance from a present position of the stylus to a straight line connecting two previous digitized points in greater than a set distance value.

3. A digitizing method according to claim 2, further comprising the steps of (d) comparing said tracing velocity F and previous output velocity information F';

(e) refraining from outputting velocity information if a velocity difference between these two velocities is less than a set velocity value; and (f) outputting said velocity information F along with the model surface profile data only if the velocity difference exceeds the set value.

4. A method of digitizing a profile of a model for machining by tracing the model with a stylus, periodically reading in a sample of position data representing a position of the stylus within a predetermined time period, and creating numerical control machining data using said position data, said method comprising the steps of:

(a) calculating a tracing velocity using the position data and the predetermined time period;

(d) including said tracing velocity in said numerical control machining data for performing machining based on the profile of the model surface and said tracing velocity;

wherein said position data represents an x, y and z value along x, y and z axes to specify a position of said stylus on the x, y, and z axes, and wherein step (a) comprises the steps of:

(a1) calculating a change in the x, y, and z value over the predetermined time period to obtain $\Delta x$, $\Delta y$, and $\Delta z$, by comparing a current the sample with a previous the sample;

(a2) calculating a traveling distance of the stylus as the square root of the sum of the squares of said $\Delta x$, $\Delta y$, and $\Delta z$; and (a3) calculating a tracing velocity for each the reading by dividing the traveling distance by the predetermined time period.

5. A method according to claim 4, wherein in step (b) the tracing velocity is only included in said NC data when a difference between said tracing velocity for a current the sample and a previous the sample exceeds a predetermined value.

6. An apparatus producing a tracing velocity for a device digitizing a profile of a model for machining having a stylus for tracing said model, input means for reading in a sample of position data, representing a position of said stylus, every predetermined time period, and a RAM for storing said position data for machining, said apparatus comprising:

calculating means for calculating a tracing velocity using the position data and the predetermined time period; and storing means for storing the tracing velocity for each sample along with the position data for each sample in the RAM for machining, wherein said position data represents an x, y and z value along an x, y and z axes to specify a position of said stylus on said x, y, and z axes, and wherein said calculating means comprises a processor which calculates a change in the x, y, and z value over the predetermined time period to obtain $\Delta x$, $\Delta y$, and $\Delta z$, by comparing a current sample with a previous sample, calculates a traveling distance of said stylus as the square root of the sum of the squares of said $\Delta x$, $\Delta y$, and $\Delta z$, and calculates a tracing velocity for each reading by said input means by dividing the traveling distance by the predetermined time period.

7. A digitizing method for tracing a model surface with a stylus by tracer control and digitizing a profile of the model surface upon reading in stylus position data at a predetermined period T, and performing machining based on the profile of the model surface, said method comprising the steps of;

(a) calculating increments $\Delta x$, $\Delta y$, $\Delta z$ along respective axes obtained while tracing the model, at the period T and calculating a traveling distance using the increments;

(b) obtaining tracing velocity from the period T and the traveling distance; and (c) outputting said tracing velocity as velocity information F along with data indicative of the model surface profile for performing machining based on the profile of the model surface and said tracing velocity;

(d) comparing said tracing velocity F and a previous output velocity F';

(e) refraining from outputting said tracing velocity F as machining velocity if a velocity difference between said velocity F and said previous velocity F' is less than a set value; and (f) outputting said tracing velocity F as the machining velocity along with said data indicative of the model surface profile only if the velocity difference exceeds the set value.

8. A digitizing method for tracing a model surface with a stylus by tracer control and digitizing a profile of the model surface upon reading in stylus position data whenever predetermined conditions are satisfied, said method comprising the steps of:

(a) calculating increments $\Delta x$, $\Delta y$, $\Delta z$ along the respective axes when said predetermined conditions are satisfied and monitoring a time T required for the conditions to be satisfied;

(b) calculating a traveling distance using said increments and obtaining a tracing velocity from the time T and the traveling distance;

(c) outputting said tracing velocity as velocity information F along with data indicative of the model surface profile for performing machining based on the profile of the model surface and said tracing velocity;

(d) comparing said tracing velocity F and previous output velocity information F';

(e) refraining from outputting tracing velocity as machining velocity if a velocity difference between these two velocities is less than a set velocity value; and (f) outputting said tracing velocity F as the machining velocity along with the model surface profile data only if the velocity difference exceeds the set value.

* * * * *